Aug. 23, 1949.  R. A. GOEPFRICH  2,479,830
INDEPENDENT CONTROL AND LOCKING
MEANS FOR TWO BRAKES
Filed March 24, 1943  4 Sheets-Sheet 1
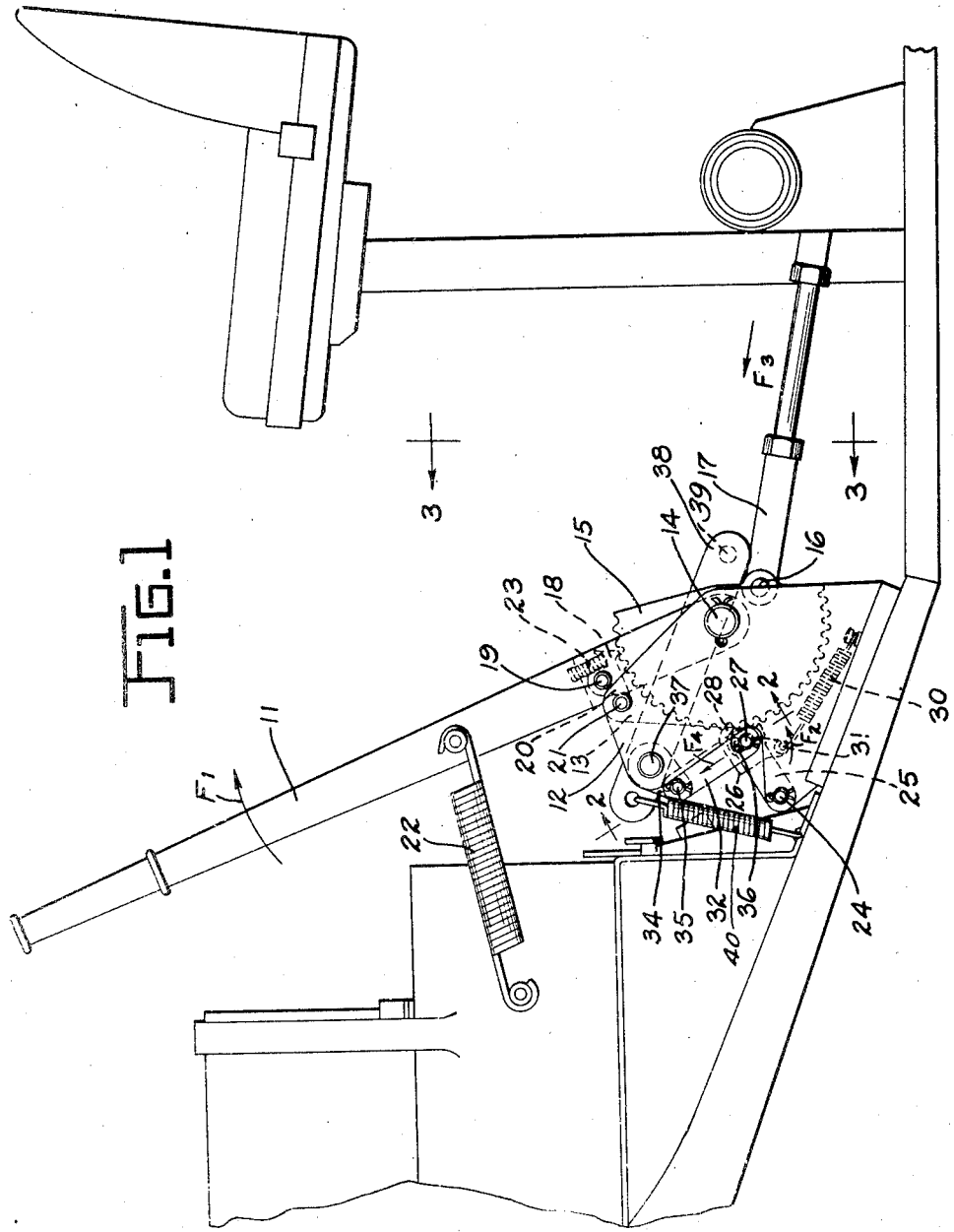
INVENTOR
RUDOLPH A. GOEPFRICH
BY
T. J. Plante Aug. 23, 1949.
R. A. GOEPFRICH
INDEPENDENT CONTROL AND LOCKING
MEANS FOR TWO BRAKES
2,479,830
Filed March 24, 1943
4 Sheets-Sheet 2
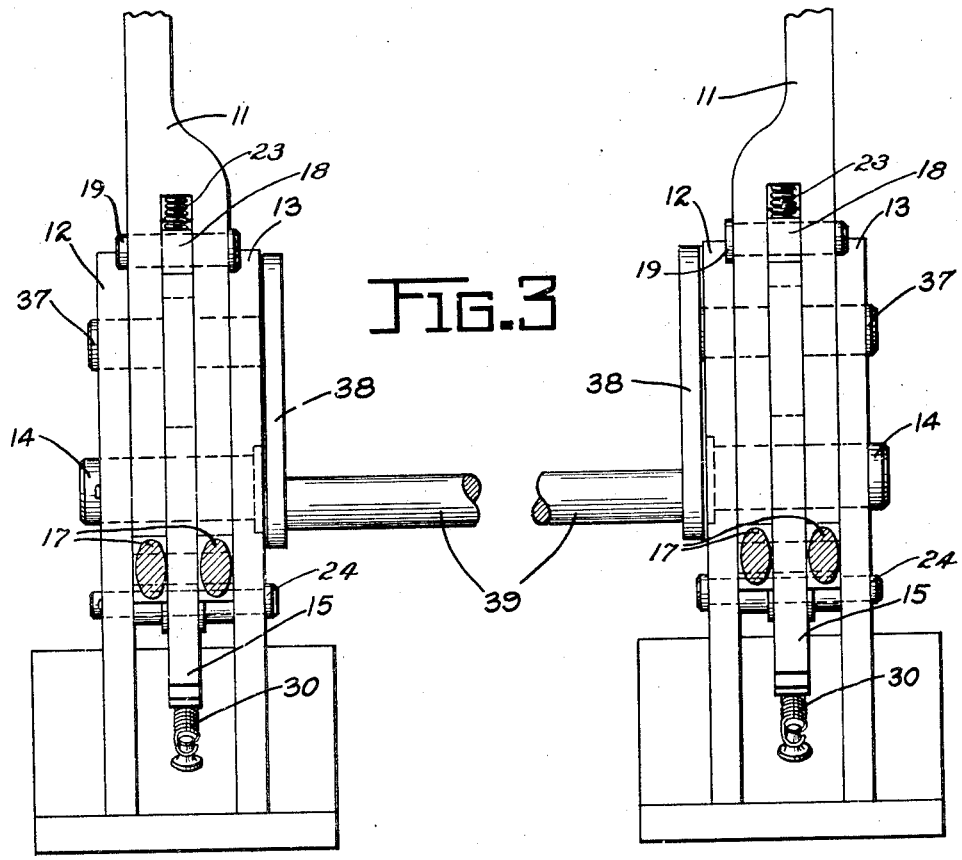
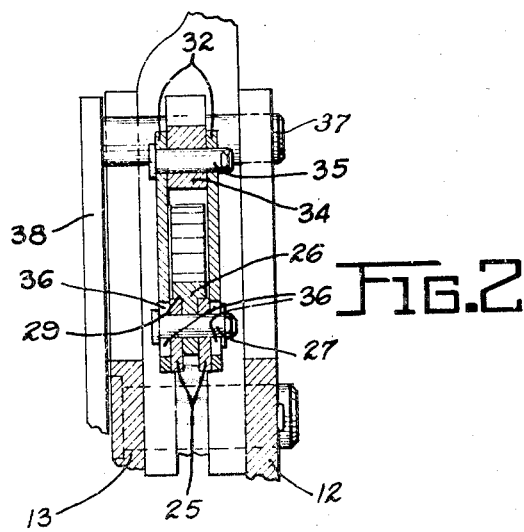
INVENTOR
RUDOLPH A. GOEPFRICH
BY
T. J. Plante INVENTOR
RUDOLPH A. GOEPFRICH
BY
T. J. Plante

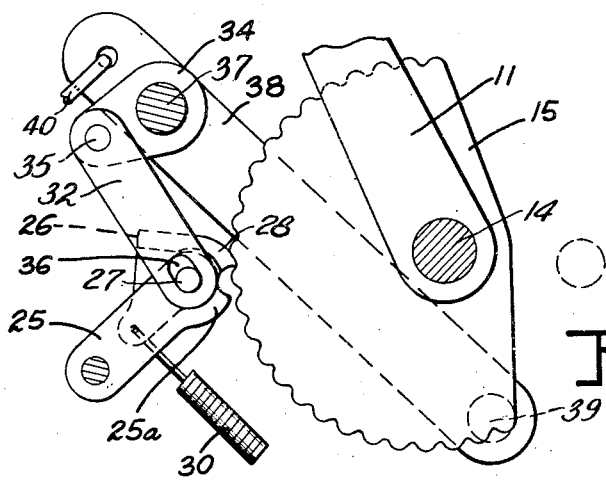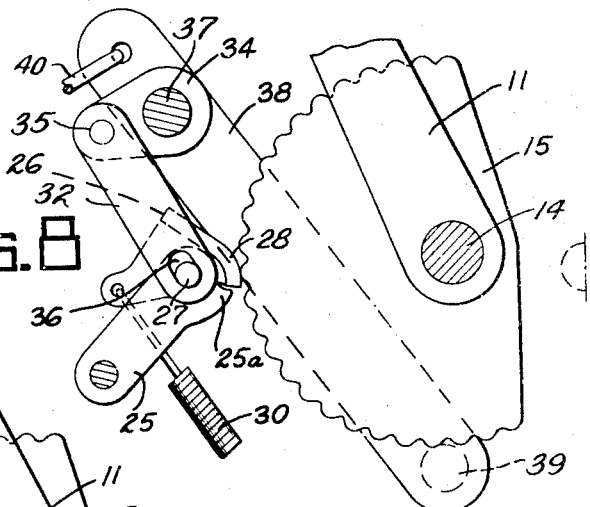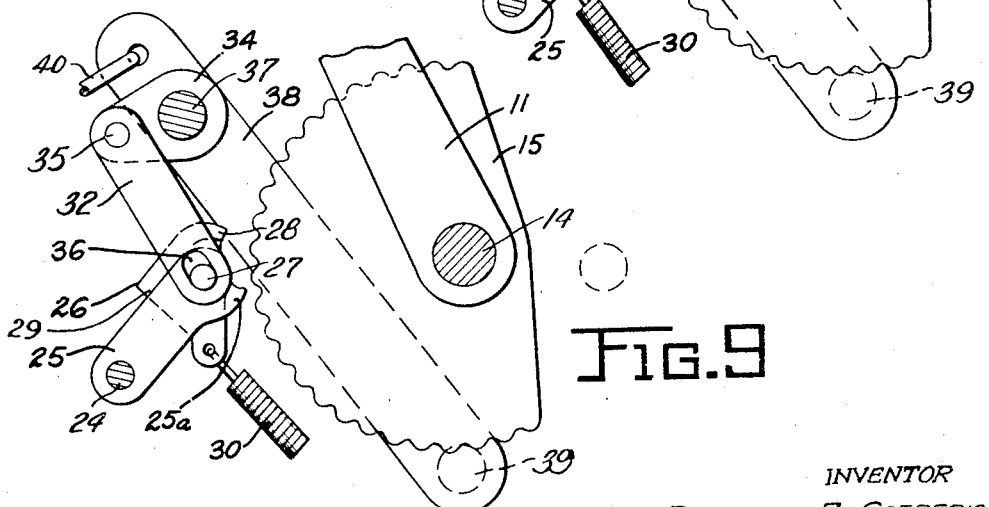

Patented Aug. 23, 1949

2,479,830

UNITED STATES PATENT OFFICE 2,479,830

INDEPENDENT CONTROL AND LOCKING MEANS FOR TWO BRAKES

Rudolph A. Goepfrich, South Bend, Ind., assignor to Bendix Aviation Corporation, South Bend, Ind., a corporation of Delaware Application March 24, 1943, Serial No. 480,308

8 Claims. (Cl. 188—16)

This invention relates to brake applying mechanism of the type which is adapted to be locked in applied position, as, for example, the parking brake of a vehicle.

An object of the invention is to increase the ease with which the locking mechanism of such a brake control may be released. Particularly in braking controls which allow an unlimited number of successive brake applying movements by the operator, the force required to release the locking mechanism may be excessive. Because use of a repeating stroke mechanism by the operator allows for a very high mechanical advantage, the applying force may be considerable.

It is my intention to increase the force available to release the brake by utilizing a releasing device which has a high mechanical advantage, such as a toggle. It is possible to use a high mechanical advantage since a relatively slight movement is required to release the lock, the return springs in the system serving to return the brake to released position when the lock has been broken.

The second object of my invention is to provide independent control of application and release of the brake, and to so arrange the independent control elements that the operator may actuate them with different members of his body. For example, he may apply the brake by hand, but release it with his foot. In order that the independent control of application and release may be provided without excessive complication of the structure, and in order that a repeating stroke applying lever may be used, I prefer utilizing a ratchet member to apply the brakes and a pair of pawls associated therewith, one movable with the applying lever to drive the ratchet member in the brake applying direction, and the other mounted on a fixed part of the vehicle to serve as an automatic locking device for the ratchet member at the end of each stroke of the applying lever. Thus the first pawl is actuated to apply the brakes and the second pawl is actuated to release them.

It is a further object of the invention to provide a common control for releasing simultaneously a plurality of brakes which are independently applied.

On modern tanks, each track is driven by its individual electric motor. The tank is steered by running one motor faster or slower than the other. For regulating the speed of the motors a tank is provided with two control devices, one for each motor, the control devices for the left motor being operated by the left hand of the operator and that for the right motor by the right hand.

These tanks are provided with brakes which are used solely for parking purposes. This includes the function of holding the tank on a grade if the driving power fails. There are two brakes, one for each track, each brake being controlled by its individual brake lever. Thus, when the driving power fails, the operator releases his grip on the motor control devices and applies the brakes by putting power on the two parking brake levers, one with each hand. A pawl and ratchet are provided for holding the brakes applied. Conventionally, a thumb-operated button or similar device is employed to release the locking pawl from its ratchet when it is desired to release the brakes.

In the heretofore known brake systems of this kind it has required considerable pressure on the thumb-operated button to release the pawl from its ratchet. In fact, it was usually found necessary to apply the brakes harder so that the load was released from the locking pawl before it could be withdrawn from its ratchet by the thumb button. This required that force be applied to the brake lever by both hands. Thus, when the tank was being held on a steep grade by means of its brakes, the above condition of affairs necessitated that one brake be released before the other. Thereupon, that side of the tank on which the brake was released would move down the grade before the other brake could be released, with the consequent loss of control of the vehicle. Moreover, even assuming that the brakes could be easily and simultaneously released by hand, it would still require some time for the operator to transfer his hands from the brake levers to the motor-control handles, during which time the tank could start rolling down the grade with consequent wear and tear on the driving mechanism in stopping this descent and starting the tank up-grade again.

In my novel arrangement, it is proposed to release the brakes by means of foot pressure. Thus, if the operator desires to start the tank while it is being held on a grade by means of its brake, he places his hands on the motor controls so that he can minipulate the same at the instant he releases the brakes by foot-pressure. To reduce the comparatively great force required to disengage the pawl from the ratchet, to eliminate the necessity of applying the brakes harder by hand in order that the pawl may be released, and to prevent the high degree of wear on the edges of the pawl and ratchet teeth which occurs just at the point of disengagement when a pawl is released from a ratchet under load, my brake control arrangement is provided with a toggle linkage, as will hereinafter be described.

Other objects and features of my invention will be apparent during the course of the following description, reference being had therein to the accompanying drawings, in which:

Figure 1 is a vertical side-view of my novel brake-control mechanism;

Figure 2 is a section taken on line 2—2 of Figure 1;

Figure 3 is a section taken on the line 3—3 of Figure 1, and showing both of the brake-applying levers and the single brake releasing pedal; and Figures 4 to 9, inclusive, are outline or diagrammatic views showing the pawl and ratchet control mechanism in various positions of application and release of the brakes.

Figure 4:
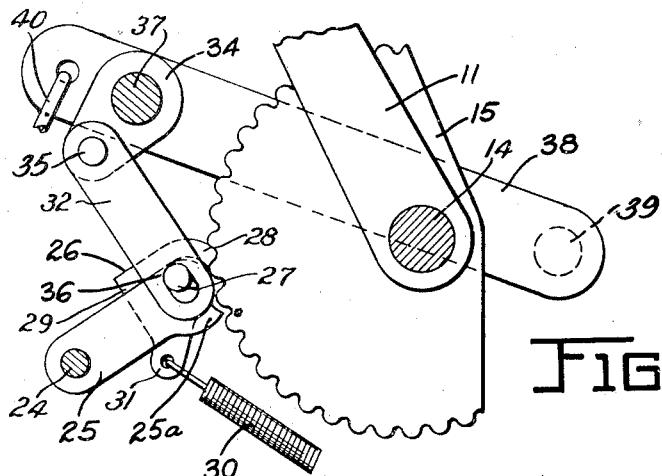

Referring now to the drawings, a brake lever 11 is pivoted between two plates 12 and 13 by means of a shaft 14. The plates 12 and 13 are rigidly fixed to the floor of the vehicle. Pivoted on the same shaft 14 is a ratchet member 15, which is provided with a pin 16 fastened to a brake rod 17 which, through an intermediate linkage, is attached to the operating parts of the brake. The lever 11 is forked at its lower end to straddle the ratchet member 15. Between the forks of the lever is pivoted a pawl 18 by means of a pin 19. This pawl is held in a disengaged position by the projecting end 20 of the pawl 18 coming into contact with a pin 21 when a spring 22 returns the lever 11 against the pin 21. A spring 23 presses the pawl 18 into engagement with the teeth of the ratchet member 15 whenever the lever 11 is moved in the direction of the arrow $F_1$.

Pivoted between the plates 12 and 13 by means of a pin 24 are a pair of links 25. Between these links 25 is pivoted a pawl 26 by means of a pin 27. The pawl 26 is provided with a nose-end 28 of appropriate shape to engage with the teeth of ratchet member 15 and is also provided with overhanging ledges 29 overlying links 25. A spring 30, anchored to the floor of the vehicle on one end and hooked to a projecting arm 31 of the pawl 26 at the other end tends to rotate the pawl 26 in the direction shown by arrow $F_2$, and thereby causes the projecting ledges 29 of the pawl to stop against the edges of the links 25. The links have projections 25a which may at times contact the end of pawl 26 (see Figure 8) to prevent excessive movement of the pawl relative to the links in the unlocking direction, the end of the pawl being a continuation of the ledges 29 and therefore wider than the body of the pawl.

A pair of links 32 are pivoted at one end by means of slots 36 and pin 27 to the links 25, and at the other end to an arm 34 by means of a pin 35. The arm 34 is fixed to a shaft 37, which shaft is journaled in the plate 12. Attached to the other end of shaft 37 is an arm 38.

The assembly thus far described is one of the parking brake levers, and is positioned to the left of the driver's seat, and is to be operated by the left hand. A similar assembly, but of opposite hand, is positioned to the right of the driver's seat and is to be operated by the right hand (see Figure 3). A rod 39 rigidly connects the outer ends of arms 38 of the left-hand and right-hand assemblies. Springs 40 (see Figure 1) are connected in tension between the left ends of the respective arms 38 and the floor of the vehicle, thereby normally retaining the arms 38 and rod 39 in released position.

Operation of the device is as follows: When it is desired to apply one or both of the brakes, the lever, or levers, 11 are gripped at their upper ends and moved in the direction shown by the arrow $F_1$ against the tension of spring 22. After a short movement the end 20 of pawl 18 leaves its stop-pin 21 and the spring 23 forces the nose of pawl 18 into the teeth of the ratchet wheel 15. The links 25 and pawl 26 constitute, in effect, the arms of a toggle joint, the knee of the toggle being the pin 27. Further movement of lever 11 rotates ratchet member 15 about its shaft 14 and causes a movement of rod 17 in the direction of arrow $F_3$, thereby applying the brake. During this brake applying movement, the pawl 28 has been snapped into engagement with the successive teeth of the ratchet member 15 by spring 30. Because the pawl 28 keeps the ratchet locked in the position to which it is moved by a given stroke of the lever 11, it is possible to use an unlimited number of successive strokes of the hand lever. When the desired degree of brake application has been effected, the hand lever 11 is released and is returned to its "off" position against pin 21 by spring 22. This releasing movement also causes the nose of pawl 18 to be withdrawn from the ratchet teeth.

The brake is now held "on" by the pawl 26. It will be noted that the forces through the toggle arms 25 and 26 are past dead center, the projecting ledges 29 of pawl 26 bearing on the edges of links 25 and thus preventing the toggle from collapsing. Both brakes are, of course, individually applied. Elongated holes or slots 36 in links 32 compensate for variations in the positions of the left-hand and right-hand ratchet wheels.

To release the brakes the operator presses down, preferably with his foot, on the bar 39. This causes arms 38 and 34 to rotate clockwise about their pivot 37, and causes links 32 to move in the direction shown by arrow $F_4$. The nose 28 of pawl 26 is thus made to "roll" out of engagement with the teeth of ratchet wheel 15 and the hookup return and brake return springs (not shown) move the ratchet wheel to its released position. The rolling movement of the pawl with respect to the ratchet wheel is permitted by the round contour of both the pawl and the ratchet teeth. The object of providing such a rolling contact is to reduce the friction which must be overcome in releasing the pawl.

That only a comparatively small force will be required to release the mechanism is insured by the rolling action of the pawl and the "flat" nature of the toggle, i. e. its closeness to dead center when the pawl is locking the ratchet.

Figure 5:
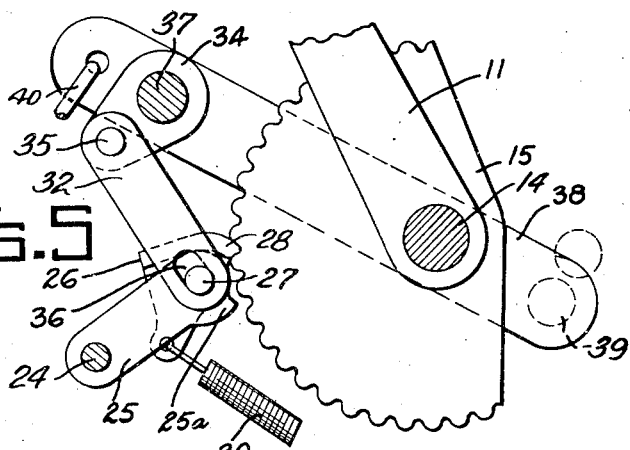
Figure 6:
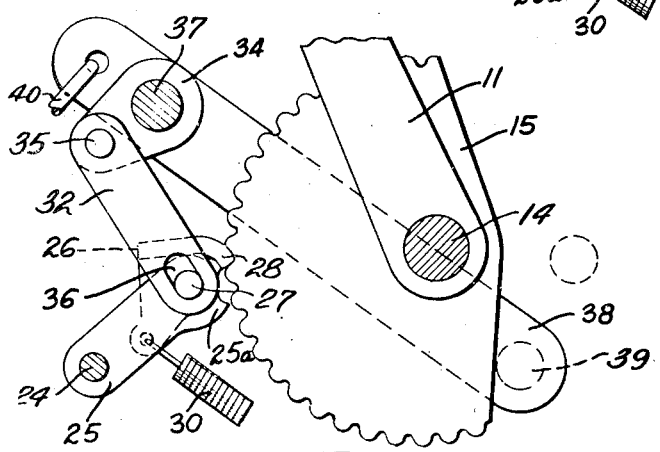

The action of the device, particularly the toggle, is shown in successive stages of operation in Figures 4 to 9 inclusive. In Figure 4 the pawl 26 is shown in locked position. In Figure 5 the position of the toggle is shown after links 25 have been rotated 4°. In Figure 6 the toggle is shown after the links have been rotated 8°, and when the toggle is just breaking. In Figure 7 the toggle is shown after the links have been rotated 12°. In Figure 8 the toggle is shown at the point of release, and after the links have been rotated 17°. In Figure 9 the device is shown fully released.

The various features of the device described in this application will be applicable in many instances and for many types of vehicles including tanks, tractors, trucks, passenger cars, and airplanes.

Although I have described a specific embodiment of my invention, it is my intention not to limit the scope of said invention to such embodiment, but to limit the scope only by the terms of the following claims.

I claim:

1. A parking brake arrangement for a vehicle having two brakes, comprising two hand operated devices for applying said brakes independently of one another, means yieldably urged for locking each of the brakes in applied position, and foot operated means common to both of the brakes for simultaneously releasing the same.

2. A brake applying and releasing device comprising a multiple-stroke applying lever, a ratchet for actuating the brakes, a pawl controlled by the lever for moving the ratchet to applied position, a second pawl which automatically locks the ratchet in applied position, and means independent of the applying lever for rolling the locking pawl to released position, said locking pawl comprising a toggle, and said releasing mechanism acting on the joint of said toggle.

3. A brake applying and releasing mechanism comprising two brake actuating elements, two multiple-stroke applying levers for operating the respective brake actuating elements, means yieldably urged for separating locking the brake actuating elements in brake applied position, and a single releasing control independent of the applying levers for simultaneously releasing the locking means of both brake actuating elements.

4. The brake applying and releasing mechanism claimed in claim 3, in which a lost motion connection between the force applying part of the releasing control and the respective locking means compensates for variations in brake applying position of the different brake actuating elements.

5. A brake control linkage for two brakes comprising two hand operated devices for individually causing application of said brakes and a single foot operated device for causing release of both of said brakes; each of said hand operated devices comprising a ratchet member connected to the respective brake to actuate the same, a lever pivoted coaxially with the ratchet wheel, a spring biasing the lever to retracted position, a first pawl member pivotally mounted on the lever and having a portion adapted to engage the teeth of the ratchet member, a spring urging the pawl member toward engagement with the ratchet teeth, a stop member arranged to contact the pawl member and hold it out of engagement with the ratchet teeth when the lever is in retracted position, a second pawl member normally in engagement with the ratchet teeth at a point circumferentially spaced from the first pawl member, a floating pivot pin on which said second pawl member is pivotally mounted, a link having one end pivotally connected to a fixed member and the other end pivotally connected to said pin, said link and said second pawl member constituting a toggle, a spring connected to the second pawl member and urging it and the pin in one direction, and a ledge on the second pawl member which contacts the edge of the link to prevent the spring from collapsing the toggle; said foot operated device comprising two floating links each having an oblong slot near one end through which the pivot pin of one of the toggles extends, two shafts rotatably carried by fixed supports and each having an arm connected to one of said floating links and adapted to pull the link in a direction to overcome the spring which acts on the toggle and pull the toggle past dead center position, and a horizontally extending bar connected to said two shafts to rotate the same simultaneously.

6. A brake control linkage for two brakes comprising two control members for individually causing application of said brakes, and a single control member for causing release of both of said brakes; each of said control members for causing application of the brakes comprising a ratchet member connected to the respective brake to actuate the same, a lever pivoted coaxially with the ratchet member, a spring biasing the lever to retracted position, a first pawl member pivotally mounted on the lever and having a portion adapted to engage the teeth of the ratchet member, a spring urging the pawl member toward engagement with the ratchet teeth, a stop member arranged to contact the pawl member and hold it out of engagement with the ratchet teeth when the lever is in retracted position, a second pawl member normally in engagement with the ratchet teeth at a point circumferentially spaced from the first pawl member, a floating pivot pin on which said second pawl member is pivotally mounted, a link having one end pivotally connected to a fixed member and the other end pivotally connected to said pin, said link and said second pawl member constituting a toggle, a spring connected to the second pawl member and urging it and the pin in one direction, and a ledge on the second pawl member which contacts the edge of the link to prevent the spring from collapsing the toggle; said control member for causing release of both brakes comprising two floating links each having an oblong slot near one end through which the pivot pin of one of the toggles extends, two shafts rotatably carried by fixed supports and each having an arm connected to one of said floating links and adapted to pull the link in a direction to overcome the spring which acts on the toggle and pull the toggle past dead center position, and a horizontally extending bar connected to said two shafts to rotate the same simultaneously.

7. A brake control linkage comprising a ratchet member connected to the brake to actuate the same, a lever pivoted coaxially with the ratchet member, resilient means biasing the lever to retracted position, a first pawl member pivotally mounted on the lever and having a portion adapted to engage the teeth of the ratchet member, resilient means urging the pawl member toward engagement with the ratchet teeth, a stop member arranged to contact the pawl member and hold it out of engagement with the ratchet teeth when the lever is in retracted position, a second pawl member normally in engagement with the ratchet teeth, a floating pivot pin on which the second pawl member is pivotally mounted, a link having one end pivotally connected to a fixed member and the other end pivotally connected to said pin, said link and said second pawl member constituting a toggle, resilient means connected to the toggle urging the pivot pin in one direction, means for preventing said resilient means from collapsing the toggle, a floating link connected at one end to the pivot pin of the toggle, and means for exerting force through the link to overcome said resilient means and pull the toggle past dead center position to release the ratchet member.

8. A brake control linkage comprising a ratchet member connected to the brake to actuate the same, a lever pivoted coaxially with the ratchet member, resilient means biasing the lever to retracted position, a first pawl member pivotally mounted on the lever and having a portion adapted to engage the teeth of the ratchet member, resilient means urging the pawl member toward engagement with the ratchet teeth, a stop member arranged to contact the pawl member and hold it out of engagement with the ratchet teeth when the lever is in retracted position, a second pawl member normally in engagement with the ratchet teeth to retain the ratchet member in a brake holding position, toggle means supporting said second pawl, and release means actuable to move said second pawl out of engagement with said ratchet member.

RUDOLPH A. GOEPFRICH.

REFERENCES CITED

The following references are of record in the file of this patent:

UNITED STATES PATENTS

| Number | Name | Date |
|---|---|---|
| 987,534 | Barr | Mar. 21, 1911 |
| 1,178,395 | Gilmartin et al. | Apr. 4, 1916 |
| 1,340,323 | Brown | May 18, 1920 |
| 1,550,980 | McElree | Aug. 25, 1925 |
| 1,635,727 | Piche | July 12, 1927 |
| 1,696,702 | Watlington | Dec. 25, 1928 |
| 1,707,415 | Ramey | Apr. 2, 1929 |
| 1,711,929 | Druhe | May 7, 1929 |
| 1,716,824 | Kossey | June 11, 1929 |
| 1,840,960 | Krueger | Jan. 12, 1932 |
| 1,876,498 | Hawkins | Sept. 6, 1932 |
| 1,900,725 | Moffett | Mar. 7, 1933 |
| 1,967,151 | Lustick | July 17, 1934 |
| 2,041,065 | Hemphill | May 19, 1936 |
| 2,129,315 | Buquor | Sept. 6, 1938 |
| 2,179,674 | Stolpe | Nov. 14, 1939 |
| 2,254,890 | Gardiner | Sept. 2, 1941 |
| 2,268,243 | Curtis | Dec. 30, 1941 |
| 2,288,169 | McCarthy | June 30, 1942 |

FOREIGN PATENTS

| Number | Country | Date |
|---|---|---|
| 471,910 | Great Britain | Sept. 13, 1937 |

Certificate of Correction

August 23, 1949

Patent No. 2,479,830

RUDOLPH A. GOEPFRICH

It is hereby certified that error appears in the printed specification of the above numbered patent requiring correction as follows:

Column 5, line 31, for the word "separating" read *separately*;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*